US012676549B2

(12) United States Patent
Tabuchi et al.

(10) Patent No.: US 12,676,549 B2
(45) Date of Patent: Jul. 7, 2026

(54) DIRECT CURRENT POWER SUPPLY APPARATUS

(71) Applicants: Hitoshi Tabuchi, Isehara (JP); Koji Tochitani, Atsugi (JP); Takehito Mishima, Atsugi (JP)

(72) Inventors: Hitoshi Tabuchi, Isehara (JP); Koji Tochitani, Atsugi (JP); Takehito Mishima, Atsugi (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 318 days.

(21) Appl. No.: 18/298,423

(22) Filed: Apr. 11, 2023

(65) Prior Publication Data

US 2023/0327556 A1 Oct. 12, 2023

(30) Foreign Application Priority Data

Apr. 12, 2022 (JP) ................................. 2022-065580

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05); *H02M 1/0019* (2021.05)

(58) Field of Classification Search
CPC ............ H02M 1/00; H02M 3/158; H02J 3/46; H03K 17/082
USPC ...................................................... 363/21.09
See application file for complete search history.

(56) References Cited

U.S. PATENT DOCUMENTS 9,385,605 B2 * 7/2016 Wilson ................ H02M 3/1582

FOREIGN PATENT DOCUMENTS

| | | |
|---|---|---|
| EP | 0535603 A1 | 4/1993 |
| JP | 2011-139609 A | 7/2011 |
| JP | 2018129910 A * | 2/2017 ............ H02M 3/155 |
| JP | 2021-093633 A | 6/2021 |

(Continued)

OTHER PUBLICATIONS

Hausmair, Kathrina; Shuli Chi; Peter Singerl: Christtian Vogel "Aliasing-Free Digital Pulse-width Modulation for Burst-Mode RF Transmitters" Feb. 2013, IEE Transactions on Circuits and Systems 1: Regular Papers, vol. 60, No. 2, pp. 415-427 (Year: 2013).*

(Continued)

*Primary Examiner* — Thienvu V Tran
(74) *Attorney, Agent, or Firm* — Shih IP Law Group, PLLC.

(57) ABSTRACT

A direct current power supply apparatus that converts direct current input voltage supplied from a direct current power supply and that outputs a direct current voltage at a different potential is shown. The apparatus includes a switching power supply apparatus and a current stabilizing circuit connected at a stage before or after the switching power supply apparatus. The switching power supply apparatus includes, an oscillating circuit in which a frequency is variable and that generates an oscillating signal to apply a switching frequency, and an oscillating control circuit that generates an oscillating control voltage or an oscillating control current that changes the frequency of the oscillating circuit to the frequency longer than the switching frequency.

3 Claims, 5 Drawing Sheets

(56)               References Cited

FOREIGN PATENT DOCUMENTS

JP         2021-191079 A    12/2021

OTHER PUBLICATIONS

Extended European search report dated Sep. 1, 2023.
EPO Communication pursuant to Article 94(3) EPC, for EP Application No. 23167495.3, dated Jan. 7, 2026.
Notice of Reasons for Refusal for Patent Application JP 2022-065580, dated Nov. 25, 2025.

* cited by examiner

FIG.1

DIRECT CURRENT POWER SUPPLY APPARATUS

REFERENCE TO RELATED APPLICATIONS

This application is based upon and claims the benefit of priority from the prior Japanese Patent Application No. 2022-65580, filed on Apr. 12, 2022, the entire contents of which are incorporated herein by reference.

TECHNICAL FIELD

The present disclosure relates to a direct current power supply apparatus including a switching power supply and a current stabilizing circuit.

DESCRIPTION OF RELATED ART

In the field of in-vehicle electronic equipment, in a situation in which direct current voltage is supplied to a load through a relatively long power supply cable from a battery such as in a driving recorder, a switching power supply (DC-DC convertor) is provided on the equipment side to prevent decrease of voltage and to enhance efficiency. As described above, in a system in which a current is supplied to the switching power supply from the battery with the long power supply cable, conducted noise rides on the power supply cable with the switching operation of the power supply apparatus, radiation noise is emitted from the power supply cable, and problems including bad influences on electronic devices such as television broadcast receivers and the like may occur.

In recent years, the importance of measures regarding electromagnetic compatibility (EMC) is increasing due to electrification of travel driving sources such as electric vehicles (EV), plug-in hybrid electric vehicles (PHEV), and introduction of advanced driving systems such as automatic driving. An EMC standard for automobiles called CISPR is established by the International Electrotechnical Commission (IEC).

Since the switching power supply (DC-DC convertor) used in the automobile is the source of the noise, it is an essential condition to suppress the noise so as to conform to standards such as CISPR 25.

In view of the above, the applicant focused on the fact that the reason for the radiation noise is that the current flowing in the power supply cable drastically changes due to the switching operation of the DC-DC converter. Then, the applicants conceived and filed an invention regarding a direct current power supply apparatus in which a current stabilizing circuit is connected to a stage before or after the DC-DC converter (JP 2021-191079).

Moreover, in the field of DC power supply, a spectrum diffusion function may be provided in a in-vehicle DC-DC converter, as a measure to handle EMC.

In order to prevent the spectrum of the energy of the electromagnetic energy emitted from the electronic device from concentrating in a narrow band, there is a technique called spectrum diffusion in which a low frequency jitter that slightly changes the frequency of an oscillating signal is applied and the energy of the radiation electromagnetic noise is distributed in a band width of a certain frequency. With this, the peak value is suppressed.

JP 2011-139609 describes providing a spectrum diffusion function in a switching regulator for electronic devices such as cell phones or PDAs in order to handle EMC. However, JP 2011-139609 does not describe a technique to decrease noise by providing a current stabilizing circuit.

The inventors calculated the magnitude of the noise conducted from an input terminal VIN of a DC-DC converter to a power supply side upstream by a simulation for a DC power supply apparatus connecting a current stabilizing circuit in a stage before the DC-DC converter and an independent DC-DC converter (switching frequency 2 MHz) not provided with the current stabilizing circuit. The results are shown in FIG. 3A and FIG. 3B. Among the above, FIG. 3A shows a frequency spectrum of conducted noise in a situation of an independent DC-DC converter, and FIG. 3B shows a frequency spectrum of conducted noise in a situation in which a current stabilizing circuit is provided in a stage before the DC-DC converter. The horizontal axes each show the frequency. In FIG. 3A and FIG. 3B, the frequency of the plurality of peaks shown in the noise correspond to the frequency of a harmonic wave with the switching frequency 2 MHz.

FIG. 2 shows a line graph selecting the noise at the maximum peak in each frequency band of the above-described 0-10 MHz, 10-20 MHz, 20-30 MHz, . . . 90-100 MHz as the representative value and plotting the values as the noise in 5 MHz, 15 MHz, 25 MHz, . . . 95 MHz. In FIG. 2, a line A shows a change in the conducted noise in a situation in which the DC-DC converter is independent, and a line B shows a change in the noise of the DC-DC converter provided with an electric current stabilizing circuit. In FIG. 2, NL1, NL2, NL3, and NL4 show the noise level of 0.5-1.6 MHz, 5.9-6.2 MHz, 30-54 MHz, and 76-90 MHz, respectively, defined as class 5 in CISPR 25.

It is clear from FIG. 2 that the conducted noise in both the independent DC-DC converter and the DC-DC converter provided with the current stabilizing circuit do not satisfy the standards of class 5 in CISPR 25.

The inventors also calculated the magnitude of the noise conducted to the power supply side by simulation in a situation in which a spectrum diffusion function is provided in a DC-DC converter operating at the switching frequency 2 MHz. The result is shown in FIG. 4A. In FIG. 2, line C shows the maximum peak of the conducted noise in each frequency band in a situation in which the spectrum diffusion function is provided. It is clear from FIG. 2 that the conducted noise under predetermined conditions in the DC-DC converter provided with the spectrum diffusion function is almost the same as the conducted noise in the situation in which the current stabilizing function is provided, and the standards of the class 5 in CISPR 25 is not satisfied. That is, in the DC-DC converter as the target of simulation, the situation of providing a spectrum diffusion function and the situation of providing a current stabilizing circuit are conditions in which the noise reduction effect are almost the same.

SUMMARY OF THE INVENTION

The present disclosure is conceived in view of the above background, and the purpose of the present disclosure is to provide a direct current power supply apparatus that satisfies the EMC standards of class 5 in CISPR 25 under the conditions that the noise reduction effects are almost the same in a situation in which a spectrum diffusion function is provided in a DC-DC converter and in a situation in which a current stabilizing circuit is provided in a DC-DC converter.

Another purpose of the present disclosure is to provide a direct current power supply apparatus in which an operation can be switched according to a request by a user or a standard regarding noise.

In order to achieve the above object, according to the present disclosure, a direct current power supply apparatus that converts direct current input voltage supplied from a direct current power supply and that outputs a direct current voltage at a different potential, the apparatus including: a switching power supply apparatus; and a current stabilizing circuit connected at a stage before or after the switching power supply apparatus, wherein the switching power supply apparatus includes, an oscillating circuit in which a frequency is variable and that generates an oscillating signal to apply a switching frequency, and an oscillating control circuit that generates an oscillating control voltage or an oscillating control current that changes the frequency of the oscillating circuit to the frequency longer than the switching frequency.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 1 is a circuit configuration diagram showing an embodiment of a direct current apparatus according to the present disclosure;

DETAILED DESCRIPTION

Figure 2:
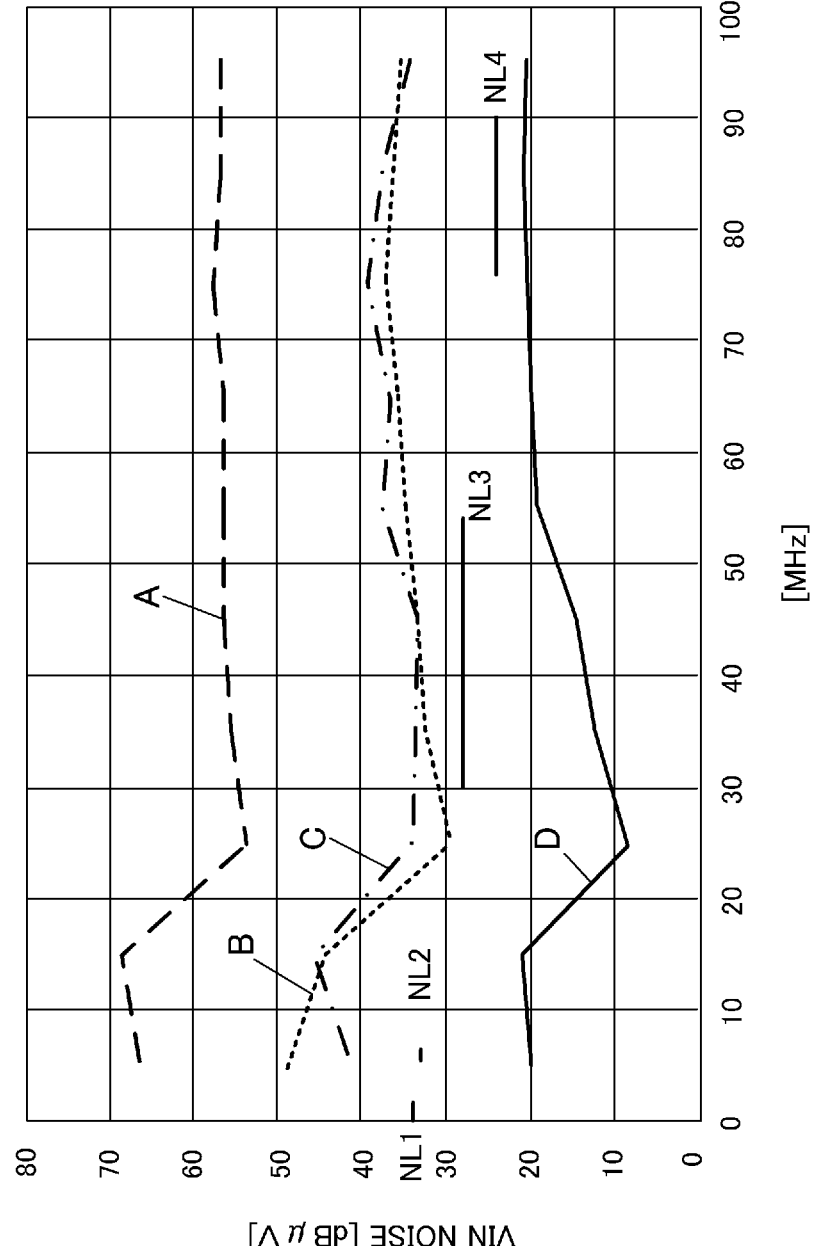
FIG. 2 is a line graph taking out the maximum peak of the frequency spectrum of the noise in each frequency band shown in FIG. 3A to FIG. 4B as the representative value.

Hereinafter, preferable embodiments of the present disclosure are described below with reference to the drawings.

Figure 1:
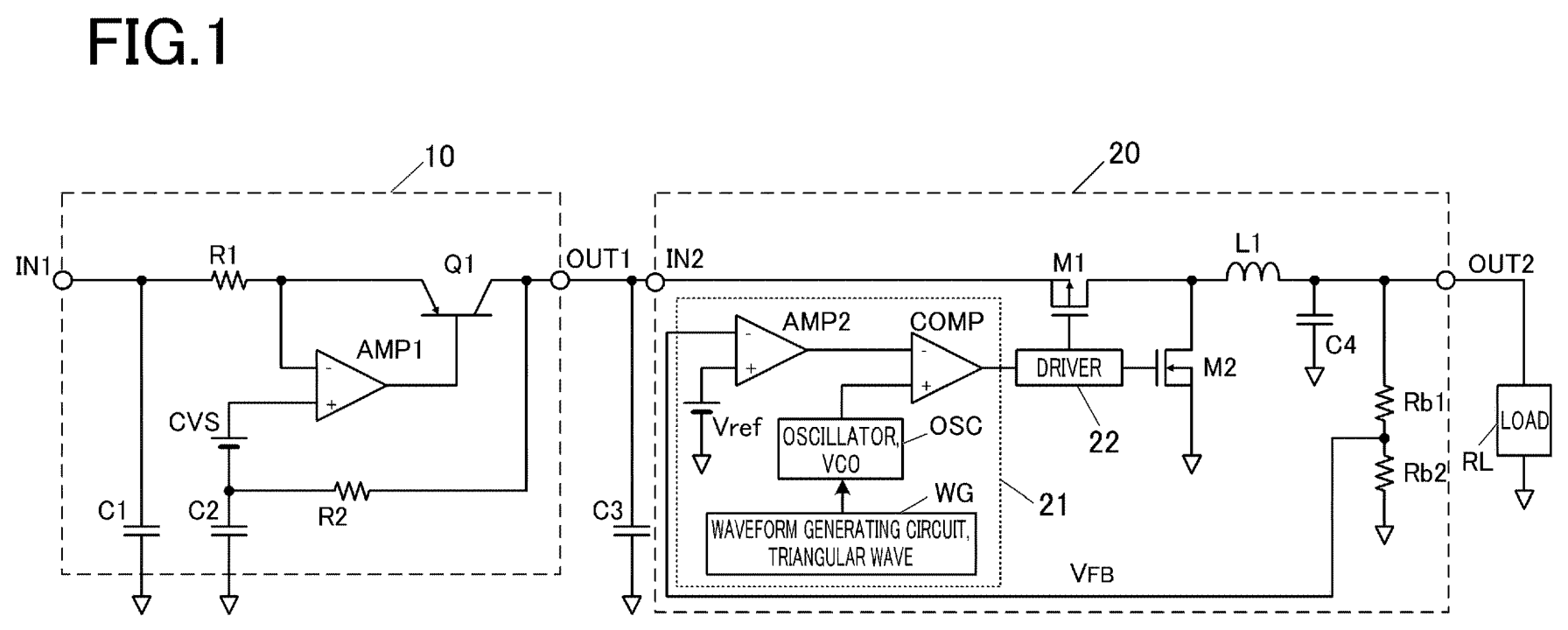

FIG. 1 shows a schematic configuration of an embodiment in a situation in which the present disclosure is applied to a direct current power supply apparatus (DC power supply apparatus) including a switching power supply (DC-DC convertor).

The DC power supply apparatus shown in FIG. 1 includes a function to convert a power supply voltage Vin input from the battery to the voltage suitable for the electronic device which is the load. With this, a stable output voltage Vout is output and a current Iout is flown to the load. In the power supply apparatus for the in-vehicle electronic device, the input voltage Vin is 3 V to 36 V, and the output voltage Vout is 3.3 V.

The DC power supply apparatus according to the present embodiment includes a current stabilizing circuit 10 and a switching control type DC-DC converter 20. The current stabilizing circuit 10 includes a current input terminal IN1 and a current output terminal OUT1. The current stabilizing circuit 10 controls the circuit input in the current input terminal IN1 from the battery through the power supply cable, etc. The DC-DC converter 20 includes a voltage input terminal IN2 and a voltage output terminal OUT2. The voltage input terminal IN2 of the DC-DC converter 20 is connected to the current output terminal OUT1 of the current stabilizing circuit 10. The load RL is connected to the voltage output terminal OUT2 of the DC-DC converter 20.

Although not limited, in a situation in which the current stabilizing circuit 10 and the DC-DC converter 20 are configured as an IC (semiconductor integrated circuit) mounted on a substrate such as a print wiring circuit, the current stabilizing circuit 10 and the DC-DC converter 20 are connected by a power supply line (one grand line) including two print wiring patterns formed on the substrate. A smoothing capacitor C1 is connected between the voltage output terminal OUT1 and a grounding point, and a smoothing capacitor C2 is connected between the voltage output terminal OUT2 and a grounding point. The current stabilizing circuit 10 and the DC-DC converter 20 may be formed as one IC on one semiconductor chip.

The current stabilizing circuit 10 in the direct current power supply apparatus according to the present embodiment includes a current control transistor Q1, a resistor R1, an operational amplifier (operational amplifier circuit) AMP1, and a constant voltage source CVS. The current control transistor Q1 includes a PNP bipolar transistor provided between the current input terminal IN1 in which DC voltage supplied from the battery is applied and the current output terminal OUT1. The resistor R1 is connected between an emitter terminal of the transistor Q1 and a current input terminal IN1. The operation amplifier AMP1 controls the transistor Q1. The constant voltage source CVS generates voltage applied to a non-inverting input terminal of the operation amplifier AMP1. An element with a low resistance value of about 10Ω is used as the resistor R1.

The current stabilizing circuit 10 includes the capacitor C1 for decreasing noise connected between the current input terminal IN1 and the grounding point and a low pass filter LPF provided between the current output terminal OUT1 and a minus side control terminal (−) of the constant voltage source CVS.

According to the present embodiment, a voltage that is higher in an amount that the voltage of the current voltage source CVS is higher than the output potential of the low pass filter LPS is applied to the non-inverting input terminal of the operation amplifier AMP2.

The low pass filter LPF includes a resistor R2 connected between the current output terminal OUT1 of the current stabilizing circuit 10 and the minus side terminal (−) of the constant voltage source CVS and a capacitor C2 connected between the minus side control terminal (−) of the constant voltage source CVS and the grounding point. A time constant is set so that among voltage variation components of the current output terminal OUT1, high frequency components corresponding to the switching frequency of the DC-DC converter 20 in the later stage are removed, and to pass the low frequency components corresponding to a servo band (servo control frequency) of the DC-DC converter 20.

With this, the low pass filter LPF transmits to the operation amplifier AMP2 through the constant voltage source CVS only the voltage variation of the current output terminal OUT1 due to the servo control of the DC-DC converter 20 in the later stage. The low pass filter LPF does not transmit to the operation amplifier AMP2 the voltage variation of the current output terminal OUT1 due to the switching control. Specifically, for example, in a situation in which the switching frequency of the DC-DC converter 20 is 2 MHz and the servo control frequency is 2.4 kHz, an element with a resistance value of 10 or so kΩ is used as the resistor R2, and an element with a capacitance value of several nF is used as the capacitor C2.

The constant voltage source CVS is configured to generate voltage (about 0.2 V) corresponding to a collector-emitter voltage VCE of a bipolar transistor, and with this, the current control transistor Q1 is able to operate at all times. Since the constant voltage source CVS is configured so that the voltage is small at about 0.2 V, the advantage is that heat loss of the transistor Q1 is suppressed and it is possible to minimize the loss generated in the transistor Q1. By not making the voltage too small, it is possible to prevent increase of a parasitic capacitance of the current control transistor Q1.

The current stabilizing circuit 10 according to the present embodiment includes the configuration as described above, and operates to flow a current represented by Ic=(ΔV−CVS)/R1. Ic is the collector current flowing in the current control transistor Q1. ΔV is the potential difference between the current input terminal IN1 and the current output terminal OUT1.

Here, as described above, the potential difference ΔV between the current input terminal IN1 and the current output terminal OUT1 removes the high frequency component due to the operation of the DC-DC converter 20 and maintains the low frequency component. Therefore, the current variation of the current output terminal OUT1 side that drastically changes by the switching operation of the DC-DC converter 20 is not transmitted to the power supply line on the upstream side but the current Ic that changes with the change of the current due to the servo control of the DC-DC converter 20 can be flown.

Figure 3A:
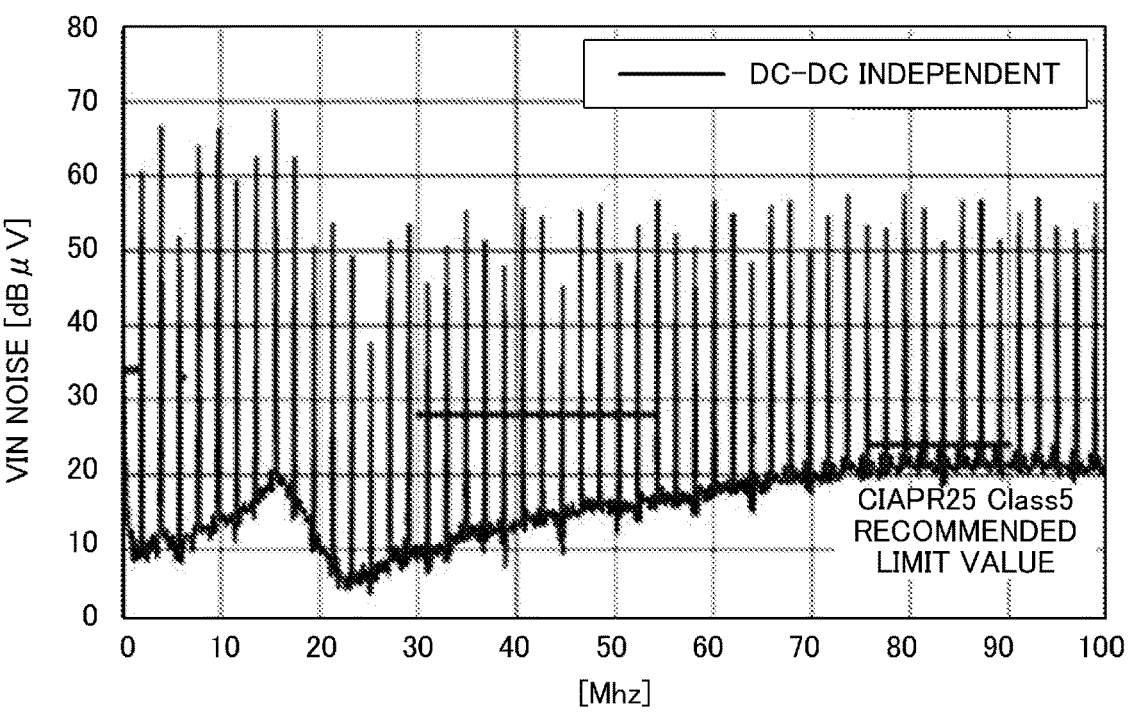
FIG. 3A is a frequency spectrum of the noise in a situation in which the DC-DC converter is independent.
Figure 3B:
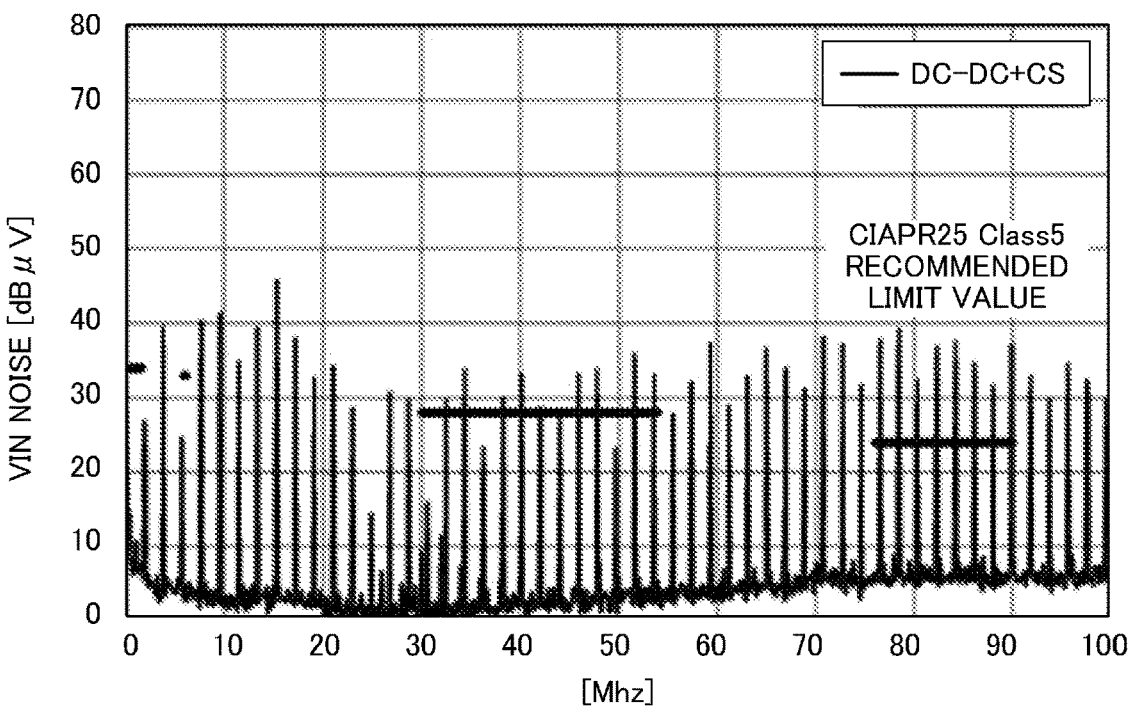
FIG. 3B is a frequency spectrum of the noise in a situation in which the DC-DC converter is provided with a current stabilizing circuit.
Figure 5:
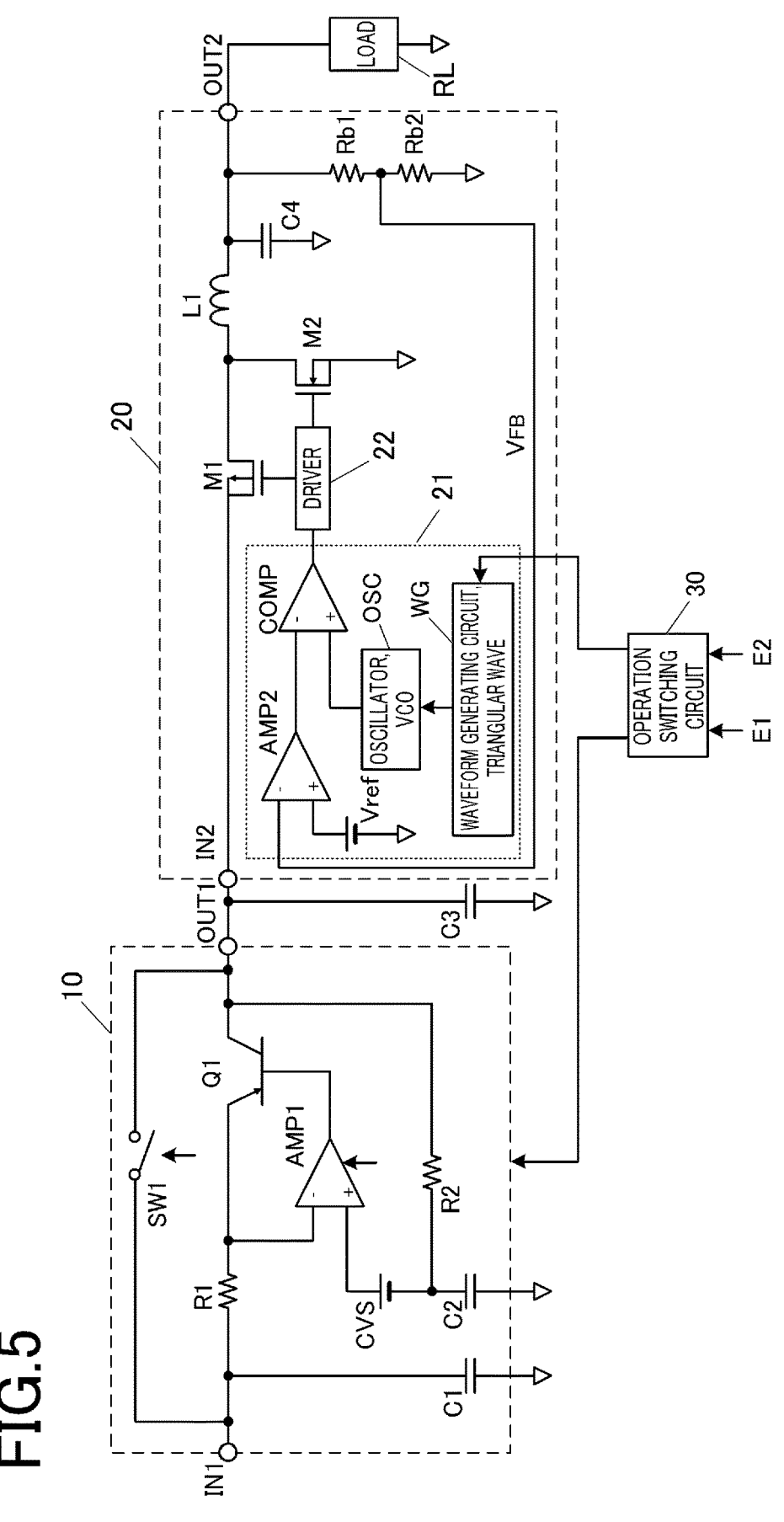
FIG. 5 is a circuit configuration diagram showing a second embodiment of the direct current power supply apparatus according to the present disclosure.

The current stabilizing circuit 10 is not limited to the circuit with the configuration as shown in FIG. 1, and for example, FIG. 3A, FIG. 3B, and FIG. 5 as described in JP 2021-191079 can be used.

Next, the DC-DC converter 20 is described.

The DC-DC converter 20 according to the present embodiment includes a switching transistor M1 and an inductor L1. The switching transistor M1 is a switching element configured with a P-channel type MOSFET (field effect transistor) connected in series between the voltage input terminal IN2 and the voltage output terminal OUT2. The inductor L1 is in series with the transistor M1. Further, the DC-DC converter 20 includes a synchronous rectifying transistor M2 connected between the grounding point and a connecting node of the transistor M1 and the inductor L1, a switching control circuit 21 that generates a signal that controls on and off of the transistors M1 and M2, and a driver (gate driving circuit) 22 that drives on and off of the transistors M1 and M2 according to the control signal from the switching control circuit 21.

Bleeder resistors Rb1 and Rb2 that divide the output voltage Vout of the DC-DC converter 20 and that are in a series form are connected between the voltage output terminal OUT2 and the grounding point.

The switching control circuit 21 includes an error amplifier AMP2, an oscillating circuit OSC, a waveform generating circuit WG, and a comparator (voltage comparator) COMP. In the error amplifier AMP2, the inverted input terminal is connected as the feedback voltage VFB in which the voltage is divided by the bleeder resistors Rb1 and Rb2. The oscillating circuit OSC generates a signal with a predetermined frequency. The waveform generating circuit WG is the oscillating control circuit that generates the control signal that controls the frequency of the oscillating circuit OSC. In the comparator COMP, the output signal of the error amplifier AMP2 and the output signal of the oscillating circuit OSC are to be the input.

A reference voltage Vref is applied to the non-inverting input terminal of the error amplifier AMP2. The error amplifier AMP2 outputs the voltage according to the potential difference between the feedback voltage VFB and the reference voltage Vref to the comparator COMP. The comparator COMP generates the pulse signal that controls on and off of the transistors M1 and M2 in a PWM (pulse width modulation) method according to the output voltage of the error amplifier AMP1. The on time of the switching transistor M1 is controlled by the pulse signal.

Specifically, the transistor M2 is turned off and the transistor M1 is turned on to supply the current to the inductor L1 and to accumulate energy. Then, the transistor M1 is turned off and the transistor M2 is turned on to discharge the accumulated energy of the inductor L1 and the current Iout is flown to the voltage output terminal OUT2. Moreover, the input voltage is converted and a predetermined DC voltage is supplied to the load. When the current of the load increases and the output voltage Vout decreases, the pulse width of the output of the comparator COMP is widened and the on time of the transistor M1 is made long. With this, the output voltage Vout is made high. On the other hand, when the current of the load decreases and the output voltage Vout increases, the pulse width of the output of the comparator COMP is narrowed and the on time of the transistor M1 is made short. With this, the output voltage Vout is made low.

According to the DC-DC converter 20 of the present embodiment, as the oscillating circuit OSC, a voltage control oscillating circuit (VCO) in which the oscillating frequency is changeable according to the voltage applied to the control terminal is used. In the waveform generating circuit WG, a triangular wave generating circuit that generates a triangular wave that changes at a frequency sufficiently lower than the switching frequency of the DC-DC converter 20 is used. The oscillating frequency of VCO is gradually increased and decreased repeatedly in response to the triangular wave generated by the triangular wave generating circuit applied on the control terminal of the VCO. Therefore, the spectrum diffusion function is realized by the VCO and the triangular wave generating circuit.

Specifically, for example, 2 MHz is selected as a fundamental frequency of the oscillating circuit OSC and 3 kHz is selected as the frequency of the triangular wave. The oscillating circuit OSC is configured so that after the frequency increases from 2 MHz to 2.4 MHz by the change of the triangular wave from the waveform generating circuit WG, the operation to reduce the frequency to 2 MHz is repeated at a cycle of 0.33 milliseconds (3 kHz). As described above, by diffusing the switching frequency upward, it is possible to prevent interference to the AM band due to downward diffusion. The fundamental frequency being 2 MHz is one example, and generally, any frequency within the range of 200 kHz to 2.2 MHz is selected.

According to the present embodiment, the voltage control oscillating circuit (VCO) is used as the oscillating circuit OSC. However, the type of oscillating circuit in which the oscillating frequency changes according to the control current may be used. The triangular generating circuit may generate saw waves (triangular waves in a broad meaning).

Figure 4A:
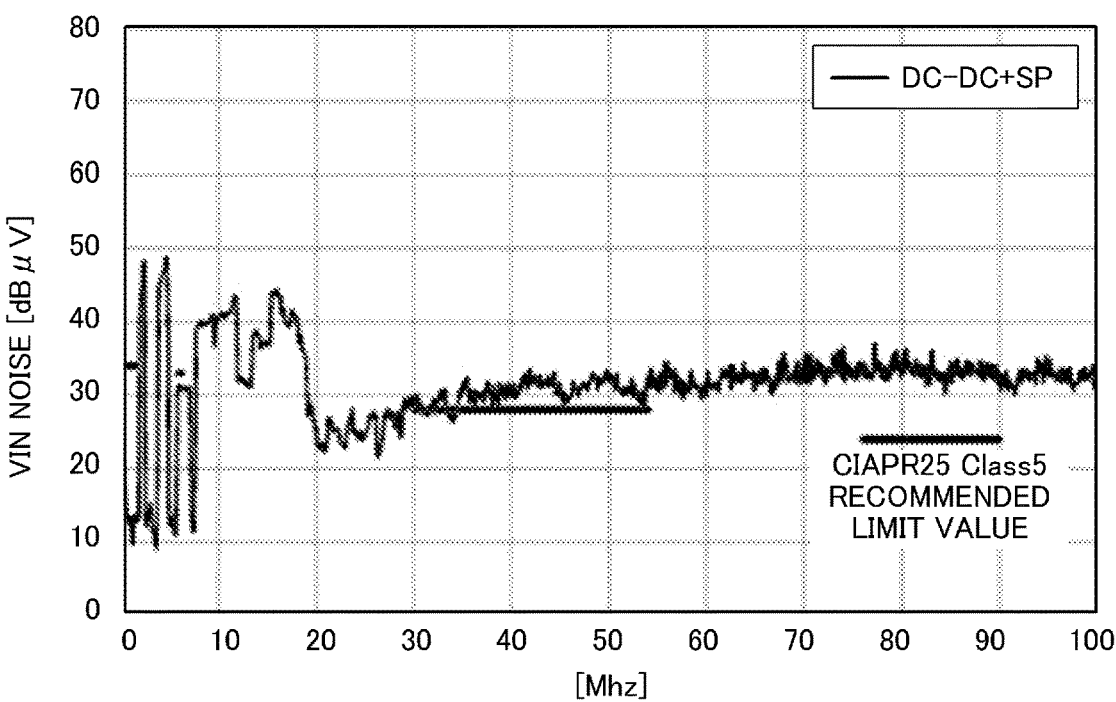
FIG. 4A is a frequency spectrum of the noise in a DC-DC converter provided with the spectrum diffusion function.
Figure 4B:
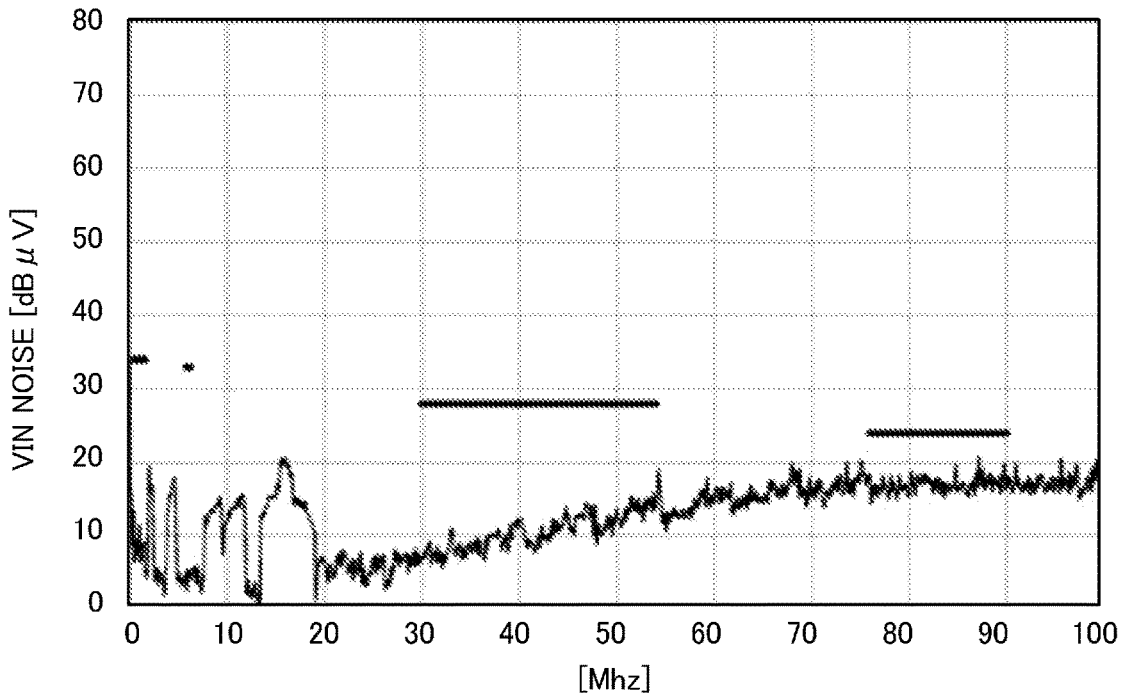
FIG. 4B is a frequency spectrum of the noise in a DC-DC converter in an embodiment provided with the current stabilizing circuit and the spectrum diffusion function.

FIG. 4B shows a frequency spectrum of conducted noise obtained by performing a simulation under the above frequency condition in the DC power supply apparatus (DC-DC converter+current stabilizing circuit+spectrum frequency function) of the present embodiment including the current stabilizing circuit 10 and the DC-DC converter 20. Based on such frequency spectrum, the noise at the maximum peak in each frequency band of the above-described 0-10 MHz, 10-20 MHz, 20-30 MHz, . . . 90-100 MHz is selected as the representative value and the values are plotted and connected as the noise in 5 MHz, 15 MHz, 25 MHz, . . . 95 MHz to be shown as a line D in FIG. 2.

According to FIG. 2 and FIG. 4B, it is clear that the DC power supply apparatus (DC-DC converter+current stabilizing circuit+spectrum diffusion function) according to the present embodiment is able to satisfy the EMC standards of class 5 of CISPR 25. This line D matches with the result predicted from the line B showing characteristics of the DC power supply apparatus including the DC-DC converter and the current stabilizing circuit and the line C showing the characteristics of the DC power supply apparatus including the DC-DC converter and the spectrum diffusion function. Further, the line D is not the line connecting the average of the noise peak value of the frequency bands in the frequency spectrum shown in FIG. 4B but is the line connecting the maximum peak points. According to the above, it is possible to understand that the noise components of the harmonic waves is completely suppressed to a noise level that is not higher than the noise level specified in class 5 of CISPR 25.

Next, using FIG. 5, a second embodiment of the DC power supply apparatus according to the present disclosure is described.

According to the DC power supply apparatus of the second embodiment, a bypass current path that bypasses the resistor R1 and the current control transistor Q1 is provided between the current input terminal IN1 and the current output terminal OUT1 of the current stabilizing circuit 10. An on/off switch SW1 is provided in the middle of the bypass current path.

An operation switching circuit 30 is provided to switch the operation mode of the circuit according to control signals E1 and E2 from outside. The on/off switch SW1 is turned on and off by the signals from the operation switching circuits 30 and the operation of the waveform generating circuit WG of the DC-DC converter 20 is switched. The other configurations are the same as the first embodiment and the description that is redundant is omitted.

The DC power supply apparatus according to the present embodiment may be a maximum of four operation states depending on the combination of the on or off state of the switch SW1 and the two states of the waveform generating circuit WG.

Specifically, in response to a switching signal from the operation switching circuit 30, the waveform generating circuit WG performs the first operation and the second operation. In the first operation, the triangular wave with a predetermined frequency is generated and output similar to the first embodiment. In the second operation, a certain voltage is output. The certain voltage output in the second operation is the voltage that causes the oscillator (VCO) to oscillate at a frequency of 2 MHz, for example.

With this, the operation switching circuit 30 includes a function to switch to operation in any one mode of the DC power supply apparatus including the DC-DC converter, the current stabilizing circuit and the spectrum diffusion function, the DC power supply apparatus including the DC-DC converter and the spectrum diffusion function, the DC power supply apparatus including the DC-DC converter and the current stabilizing circuit, and the DC power supply apparatus including an independent DC-DC converter. The DC power supply apparatus may be configured to include the function to switch among two or three of the above four operation modes.

When the on/off switch SW1 is turned on, the operation of the operation amplifier AMP1 of the current stabilizing circuit 10 stops, and the current control transistor Q1 is to be in an off state. With this, the power consumed in the current stabilizing circuit 10 can be reduced during the on term of the switch SW1.

According to the first and second embodiments, the current stabilizing circuit 10 is provided to reduce the noise, and the resistor R1 that detects the output current value is provided in the current stabilizing circuit 10. Therefore, compared to the situation in which the current stabilizing circuit 10 is not provided, the output voltage becomes low. Among the users, there may be users who prefer avoiding decrease in the output voltage compared to reduction of the noise and there may be users who prefer reducing noise compared to avoiding decrease in the output voltage.

The DC power supply apparatus according to the second embodiment includes the bypass switch SW1 for bypassing between IN1 and OUT1 in the current stabilizing circuit 10 and the operation switching circuit 30. Therefore, it is possible to switch operation so as to operate as a power supply apparatus prioritizing noise reduction or a power supply apparatus prioritizing avoiding decrease in output voltage. Moreover, the apparatus may be configured to switch operation of the power supply apparatus according to the standards of the noise such as class 5 and class 4 of the CISPR 25.

In a situation in which the current stabilizing circuit 10, the DC-DC converter 20 (not including L1, C4, Rb1, Rb2), and the operation switching circuit 30 are configured as one IC, an external terminal (pin) or pad to input the control signals E1 and E2 to the operation switching circuit 30 may be provided. In this case, an external pull-up resistor or pull-down resistor may be connected to the external terminal (pin) or pad to replace the control signals E1 and E2. Further, a resistor that maintains the state of the control signals E1 and E2 input in the operation switching circuit 30 may be provided.

The present invention conceived by the inventors is described in detail on the basis of the embodiments, but the present invention is not limited to the embodiments described above. For example, according to the present embodiment, a waveform generating circuit WG that generates triangular waves that continuously change is provided. Instead of such waveform generating circuit WG, it is possible to provide a circuit (oscillating frequency changer) that generates a voltage or signal that changes the oscillating frequency of the oscillator (VCO) stepwise.

According to the present embodiment, the direct current power supply apparatus provided with the current stabilizing circuit 10 in a stage before the DC-DC converter 20 is shown. Alternatively, the direct current power supply apparatus may be configured so that the current stabilizing circuit 10 is provided in a stage after the DC-DC converter 20.

According to the present embodiment, a bipolar transistor is used as the transistor included in the current stabilizing circuit 10, but an MOS transistor may be used instead of the bipolar transistor. According to the present embodiment, the direct current power supply apparatus that uses the synchronous rectifying DC-DC converter as the DC-DC converter 20 is described. Alternatively, instead of the switching transistor M2, an asynchronous rectifying DC-DC converter that uses diode may be used.

Further, according to the present embodiment, an example of applying the present disclosure to the system in which the non-insulated DC-DC converter is used as the direct power supply apparatus is described. Alternatively, the present disclosure can be applied to a system in which the isolated DC-DC converter that includes a transformer and that performs switching control of the current flown to a primary side winding is used as the direct current power supply apparatus.

According to the direct current power supply apparatus of the present disclosure, it is possible to provide a direct current power supply apparatus in which the noise that occurs due to the switching operation is further decreased and that satisfies the EMC standards of class 5 in CISPR 25 under the conditions that the noise reduction effects are almost the same in a situation in which a spectrum diffusion function is provided in a DC-DC converter and in a situation in which a current stabilizing circuit is provided in a DC-DC converter. Moreover, it is possible to switch the operation according to the user's needs, that is, whether to put priority on reduction of noise or avoiding decrease of voltage, or according to the standards of the noise. With this, the flexibility and the ease of use can be enhanced.

According to the direct current power supply apparatus including the above configuration, the frequency of an oscillating circuit that generates the oscillating signal that provides the switching cycle of the switching power supply apparatus (DC-DC converter) can be changed, and the frequency of the oscillating circuit changes to a cycle longer than the switching cycle by the oscillating control voltage or the oscillating control current generated by the oscillating control circuit. Therefore, the spectrum diffusion function is realized by the oscillating circuit and the oscillating control circuit.

Further, due to the circuit stabilizing circuit connected in the stage before or after the switching power supply apparatus, it is possible to suppress the noise generated by the switching operation of the switching power supply apparatus being conducted to the power supply line. With this, it is possible to suppress the current of the power supply line greatly changing and the radiated noise being emitted from the power supply line. As a result, it is possible to satisfy the EMC standards of class 5 in CISPR 25.

Although some embodiments of the present invention have been described and illustrated in detail, the disclosed embodiments are made for purposes of not limitation but illustration and example only. The scope of the present invention should be interpreted by terms of the appended claims.

The invention claimed is:

1. A direct current power supply apparatus that converts direct current input voltage supplied from a direct current power supply and that outputs a direct current voltage at a different potential, the direct current power supply apparatus comprising:

a switching power supply apparatus; and a current stabilizing circuit, wherein the current stabilizing circuit is connected at a stage before the switching power supply apparatus, wherein the switching power supply apparatus includes:

an oscillating circuit in which a frequency is variable and that generates an oscillating signal to apply a switching cycle, and an oscillating control circuit that generates an oscillating control voltage or an oscillating control current that changes the frequency of the oscillating circuit to the cycle longer than the switching cycle, wherein the oscillating control circuit is configured to diffuse a switching frequency upward, wherein the oscillating circuit is a voltage control oscillating circuit configured to be able to change an oscillating frequency according to an applied voltage, wherein the oscillating control circuit is a triangular wave generating circuit that generates a triangular wave in which a voltage value gradually increases or gradually decreases, and wherein the triangular wave generated by the triangular wave generating circuit is applied to the oscillating circuit as a voltage that changes the oscillating frequency.

2. The direct current power supply apparatus according to claim 1, further comprising, a current bypass path that is connected between a current input terminal of the current stabilizing circuit and a current output terminal of the current stabilizing circuit, a current switch element provided in a middle of the current bypass path, and an operation switching circuit that generates a signal that controls on and off of the current switch element according to a signal or voltage from outside and generates a signal that controls the current switch element, wherein the direct current power supply apparatus is configured to prioritize noise reduction when the current switch element is off and to prioritize avoiding decrease in output voltage when the current switch element is on.

3. The direct current power supply apparatus according to claim 2, wherein the oscillating control circuit is configured to switch between a first operation state in which the generated oscillating control voltage is changed and a second operation state in which the oscillating control voltage is fixed, and wherein the operation switching circuit is configured to generate a signal to switch the operation states of the oscillating control circuit.

* * * * *